United States Patent
Hikami et al.

[11] Patent Number: 5,969,911
[45] Date of Patent: Oct. 19, 1999

[54] INDUCTIVE/MR COMPOSITE TYPE THIN-FILM MAGNETIC HEAD

[75] Inventors: Fuminori Hikami; Masayuki Takagishi, both of Mishima-gun, Japan

[73] Assignee: Read-Rite SMI Corporation, Osaka, Japan

[21] Appl. No.: 09/035,778

[22] Filed: Mar. 4, 1998

[30] Foreign Application Priority Data

Mar. 6, 1997 [JP] Japan .................................. 9-067506

[51] Int. Cl.⁶ ........................... G11B 5/127; G11B 5/147; G11B 5/39; G11B 5/10
[52] U.S. Cl. ........................... 360/113; 360/126; 360/128
[58] Field of Search ................................... 360/123, 124, 360/126, 113, 128

[56] References Cited

U.S. PATENT DOCUMENTS

| | | | |
|---|---|---|---|
| 4,652,957 | 3/1987 | Schewe et al. | 360/125 |
| 4,675,766 | 6/1987 | Schewe | 360/123 |
| 5,703,740 | 12/1997 | Cohen et al. | 360/126 |

Primary Examiner—Craig A. Renner
Assistant Examiner—Angel Castro
Attorney, Agent, or Firm—Blakely, Sokoloff, Taylor & Zafman, LLP

[57] ABSTRACT

An inductive/MR composite type thin film magnetic head which realizes high speed, high density recording while at the same time preventing the occurrence of read-out error by reducing NLTS. In one embodiment an inductive/MR composite type thin-film magnetic head is equipped with [a] an inductive head used for writing in which a magnetic gap layer, a conductive coil and insulating layers are laminated between upper and lower magnetic films, and [b] a magnetic resistance (MR) head used for read-out consisting of an MR element sandwiched between an upper shield which also serves as the aforementioned lower magnetic film, and a lower shield, the aforementioned conductive coil is formed in the shape of a solenoid which is wrapped around the aforementioned upper magnetic film by forming a lower coil part consisting of numerous segments on the surface of the first insulating layer, and then forming an upper coil part consisting of numerous segments from a point above a second insulating layer, upper magnetic film and third insulating layer laminated on the surface of the lower coil part, so that the respective end portions of the segments of the upper coil part are alternately connected with the respective end portions of the segments of the lower coil part.

8 Claims, 11 Drawing Sheets

INDUCTIVE/MR COMPOSITE TYPE THIN-FILM MAGNETIC HEAD

BACKGROUND OF THE INVENTION

1. Field of the Invention

The present invention concerns an inductive/MR composite type thin-film magnetic head which is integrally equipped with an inductive head used for writing and a magnetic resistance (MR) head used for readout, and which can be used in recording and playback devices of various types of equipment such as computers and word processors, etc., for example, in hard disk drives, etc.

2. Background Information

Recently, composite type thin-film magnetic heads in which an inductive head used for writing and an MR head used for read-out are combined into an integral unit have been employed as thin-film magnetic heads used in magnetic disk drives of computers, etc. In such composite type thin-film magnetic heads, the MR head has a large playback sensitivity and the playback output is not dependent on the relative speed with the recording medium. Accordingly, it is possible to reduce the track width and to reduce the number of turns of the coil so that the impedance is lowered, thus making it possible to achieve higher-density magnetic recording, a more compact apparatus and an increased output.

In conventional composite thin-film magnetic heads, as is shown for example in FIGS. 8 and 9, an MR head 5 consisting of an MR element 4 which is sandwiched between a lower shield 2 and upper shield 3 is formed on the surface of a ceramic substrate 1 which is covered by an insulating underlayer film. An inductive head 11 is then formed on top of this by using the aforementioned upper shield 3 as a lower magnetic film, and laminating a magnetic gap film 6, organic insulating layers 7 and 8, conductive coil 9 and upper magnetic film 10 on top of said lower magnetic film. The conductive coil 9 is generally formed in a spiral shape centered on the back gap 12 by means of a conductive material plating formed using a photolithographic technique.

The recording of signals on a recording medium 13 is accomplished by applying a square-wave writing current of the type shown in FIG. 10A to the coil 9 via lead wires 14 and 15 so that magnetic flux is generated in the magnetic transducing gap 16 between the upper and lower pole parts at the tip ends of the aforementioned magnetic films, thus creating regions of inverted magnetization known as magnetization transitions with the timing of the plus-minus switching of the writing current. The recorded signals are reproduced with high fidelity as follows: i.e., the magnetic flux from the recording medium passing through the MR element 4 varies with the timing at which the abovementioned magnetization transitions pass between the aforementioned upper and lower shields, and this variation causes a variation in the resistance of the MR element, so that electrical signals are produced.

A writing head with a superior recording capacity is necessary in order to realize high-speed, high-density recording in such a composite type thin-film magnetic head. However, in cases where signals are recorded at a high density on a recording medium, adjacent magnetization transitions interfere with each other so that a nonlinear shift in the writing positions known as a nonlinear transition shift (NLTS) occurs in the recording medium. This increases the read-out error during the playback of the signals.

The conventional inductive head shown in FIGS. 7 and 8 has a resistance and inductance which correspond to the coil length of the spiral-form coil 10. Here, the inductance has a positive correlation with the area surrounded by the outermost circumference of the aforementioned coil. Furthermore, because of the effects of magnetic bodies such as the upper magnetic film 10 and upper shield 3, etc., present in the surrounding area, the inductance is larger than it would be in the case of the coil alone. When the resistance and inductance of the aforementioned coil are increased, the impedance increases. Accordingly, a delay component created by this impedance is generated in the writing current that flows through the coil.

If this delay is large, as is shown in FIG. 10B, a distortion known as "corruption" is generated in the square waveform of the writing current, so that the time required for plus and minus switching of the writing current, i.e., the rise time, is increased. If the rise time of the writing current is large, the time required for the inversion of the direction of the magnetic flux generated in the magnetic transducing gap, i.e., the rise time of the magnetic flux, is increased. Since a positive correlation of the type shown in FIG. 11 exists between the rise time of the magnetic flux and the abovementioned NLTS, it is important to lower the inductance of the aforementioned coil, and thus reduce the rise time of the writing current, in order to reduce the NLTS.

Furthermore, an eddy current loss caused by the writing current flowing through the coil is generated in the yoke parts of the upper and lower magnetic films, and this eddy current loss generates a delay in the high-frequency component of the magnetic field generated between the upper and lower pole parts. Accordingly, if the eddy current loss in both of the aforementioned magnetic films can be reduced, the rise time of the magnetic flux can similarly be shortened so that the NLTS can be reduced. The eddy current loss in the aforementioned magnetic films can be reduced by shortening the yoke length, i.e., the magnetic path length L'. However, in order to do this, it is necessary to reduce the pitch per turn of the coil.

In the case of conventional spiral-form coils formed by the abovementioned photolithographic technique, however, there is an upper limit on the aspect ratio from the standpoint of manufacturing technology. As a result, the thickness of the coil is limited in cases where the coil pitch is reduced. Accordingly, the coil resistance has an inversely proportional relationship with the magnetic path length, as indicated by the broken line in FIG. 4 Meanwhile, because of restrictions in terms of the electrical circuit formed by the aforementioned lead wires and coil, etc., the coil resistance cannot be increased beyond a certain upper-limit value. As a result, the minimum value of the magnetic path length, i.e., the yoke length of the aforementioned magnetic films, is determined by the set value of the coil resistance. Accordingly, there are limits to the reduction in NLTS that can be achieved by reducing the eddy current loss of the upper and lower magnetic films.

Thus, it is desired to provide an inductive/MR composite type thin-film magnetic head which makes it possible to reduce NLTS and prevent the generation of read-out error while realizing high-speed, high-density recording. Furthermore, it is desired to provide an inductive/MR composite type thin-film magnetic head which can be manufactured relatively easily and inexpensively using conventional manufacturing techniques "as is."

SUMMARY OF THE INVENTION

An inductive/MR composite type thin-film magnetic head is described. In one embodiment, the inductive/MR composite type thin-film magnetic head includes an inductive head used for writing, the inductive head having a magnetic gap layer, a conductive coil and insulating layers laminated between an upper magnetic film and a lower magnetic film. The conductive coil is formed in a shape of a solenoid wrapped around the upper or lower magnetic film with the insulating layers interposed. The inductive/MR composite type thin-film magnetic head also includes a magnetic resistance (MR) head used for read-out, the MR head having an MR element sandwiched between an upper shield and a lower shield, wherein the lower magnetic film includes the upper shield.

EXPLANATION OF SYMBOLS

Figure 1:
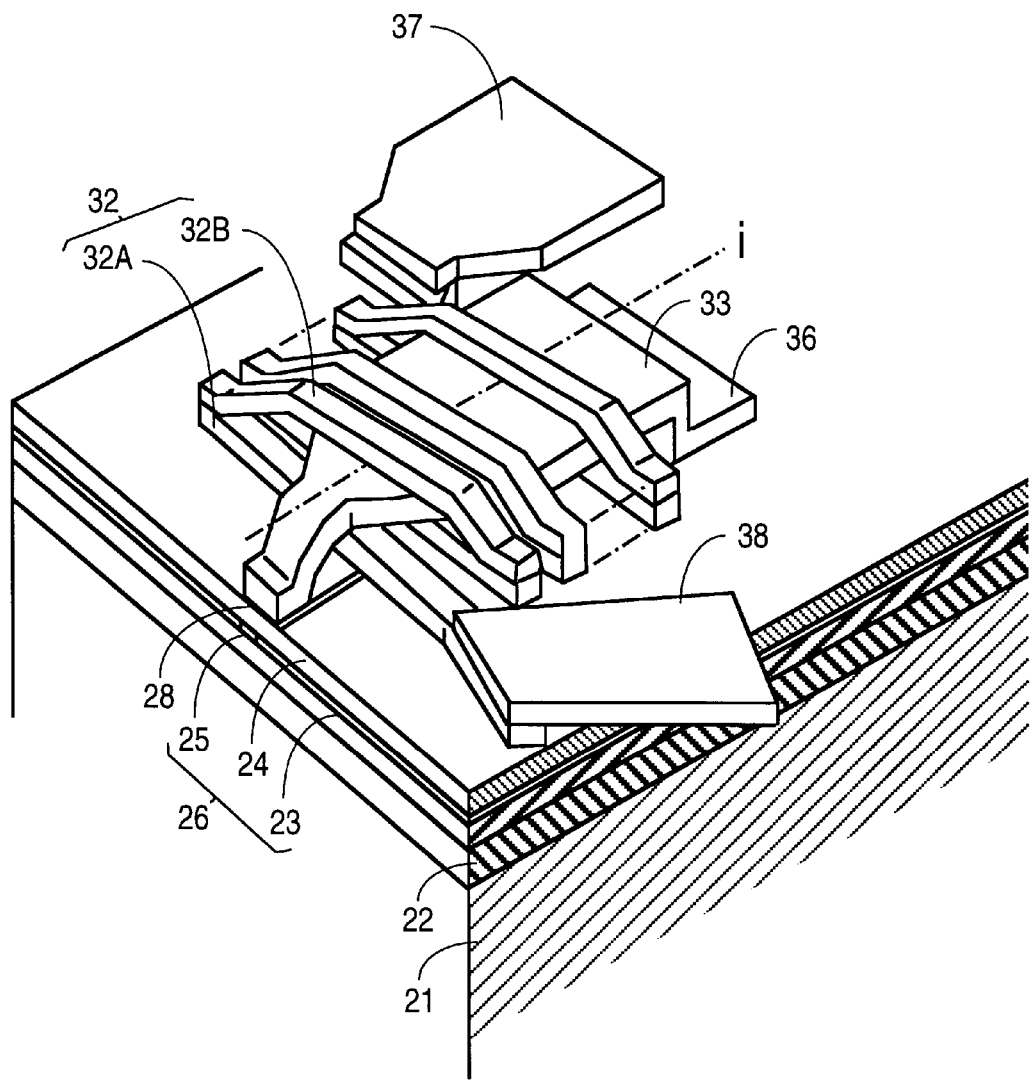
FIG. 1 is a schematic perspective view which illustrates the construction of a first embodiment of the inductive/MR composite type thin-film magnetic head of the present invention.

1 Substrate
2 Lower shield
3 Upper shield
4 MR element
5 MR head
6 Magnetic gap film
7, 8 Organic insulating layers
9 Conductive coil
10 Upper magnetic film
11 Inductive head
12 Back gap
13 Magnetic recording medium
14, 15 Lead wires
16 Magnetic transducing gap
21 Substrate
22 Insulating underlayer film
23 Lower shield
24 Upper shield
25 MR element
26 MR head
27 Inductive head
28 Magnetic gap layer
29, 30, 31 Organic insulating layers
32 Conductive coil
32a Lower coil part
32b Upper coil part
33 Upper magnetic film
34 Upper protective layer
35 Surface facing recording medium
36 Back gap
37, 38 Lead wires
39 Conductive coil
40 First coil
40a lower coil part
40b Upper coil part
41 Second coil
42 Lead wire
43, 44 Insulating films
45 Shield part
46 Portion around which coil is wrapped
47 First insulating layer
48 Terminal part used for connection
49 through 53 Second through sixth insulating layers
54 Recess.

DETAILED DESCRIPTION

In one embodiment, an inductive/MR composite type thin-film magnetic head of the present invention includes [a] an inductive head used for writing in which a magnetic gap layer, a conductive coil and insulating layers are laminated between upper and lower magnetic films, and [b] a magnetic resistance (MR) head used for read-out consisting of an MR element sandwiched between an upper shield which also serves as the aforementioned lower magnetic film, and a lower shield. Furthermore, this inductive/MR composite type thin-film magnetic head is characterized by the fact that the aforementioned conductive coil is formed in the shape of a solenoid which is wrapped around the aforementioned upper or lower magnetic film with the aforementioned insulating layers interposed.

As a result of the use of such a solenoid-form conductive coil in the writing head, the area surrounded by the outermost circumference of the coil is greatly reduced compared to that in a conventional inductive/MR composite type thin-film magnetic head using a spiral-from coil, even though the coil length is the same. Accordingly, the inductance can be greatly reduced, so that the rise time of the writing current can be greatly reduced. Furthermore, the yoke length of the upper and lower magnetic films, i.e., the magnetic path length, can also be greatly reduced. Accordingly, the eddy current loss of the writing current flowing through the magnetic films can be greatly reduced, so that the rise time of the magnetic flux can be greatly reduced.

In this case, it is desirable that the width of at least the portion of the upper or lower magnetic film around which the conductive coil is wrapped be equal to or less than the magnetic path length. Furthermore, it is even more desirable that this width be equal to ½ of the magnetic path length or less, and a width of 30 microns or less is especially desirable.

Furthermore, if the aforementioned conductive coil is wrapped around both the upper and lower magnetic films, the magnetic path length can be reduced much further, so that the eddy current loss of the writing current can be reduced by an even greater amount. Accordingly, such an arrangement is desirable.

The aforementioned conductive coil can be manufactured using conventional inductive head film formation techniques "as is" by [a] forming a lower coil part consisting of numerous segments on the surface of a first insulating layer, and [b] forming an upper coil part consisting of numerous segments from a point above a second insulating layer, the upper or lower magnetic film and a third insulating layer, which are all laminated on the surface of the lower coil part, so that the respective end portions of the segments of this upper coil part are alternately connected with the respective end portions of the segments of the lower coil part.

Below, the present invention will be described in detail in terms of embodiments with reference to the attached figures.

Figure 2:
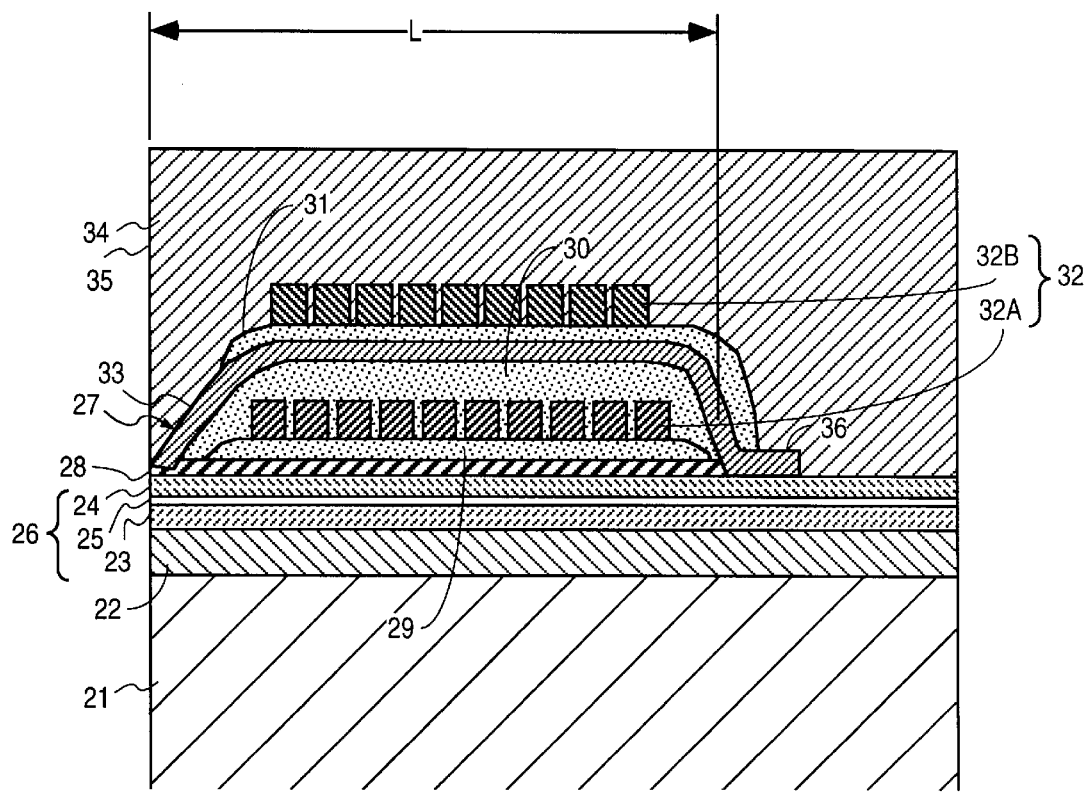
FIG. 2 is a longitudinal section of the composite type thin-film magnetic head shown in FIG. 1.

FIGS. 1 and 2 illustrate a first embodiment of the inductive/MR composite type thin-film magnetic head of the present invention. In this composite thin-film magnetic head, an insulating underlayer film 22 consisting of alumina or Si, etc., is deposited on the surface of a substrate 21 consisting of an $Al_2O_3$—TiC ceramic material. An MR head 26 used for read-out which has a lower shield 23 and upper shield 24 formed by plating or sputtering a soft magnetic material such as a permalloy alloy, cobalt alloy or iron sendust alloy, etc., and an MR element 25 which is sandwiched between these shields, is formed on top of the aforementioned insulating underlayer film 22. The MR element 25 is formed from a magnetic resistance thin film consisting of NiFe, etc., a bias film used to reduce distortion of the playback signals, and a domain stabilizing film, etc., which are installed between upper and lower magnetic gap layers consisting of insulating films made of alumina, etc.

The inductive head 27 used for writing has a magnetic gap film 28 consisting of alumina which is used to form a magnetic transducing gap and which is formed on the surface of the upper shield 24, which also acts as the lower magnetic film, organic insulating layers 29, 30 and 31 consisting of a novolak type resin, a conductive coil 32 used for writing which consists of Cu, an upper magnetic film 33 consisting of a plating film of NiFe, and an upper protective layer 34 which is laminated on top of the abovementioned layers. The first a second insulating layers 29 and 30 are formed between the lower magnetic film 24 and the upper magnetic film 33, and the third insulating layer 31 is formed on the surface of the upper magnetic film 33.

The coil 32 used in the present embodiment is formed in the shape of a solenoid which is wrapped in numerous turns at a uniform spacing around the upper magnetic film 33 along an axial line i perpendicular to the surface 35 facing the recording medium, from the vicinity of the pole parts at the tip ends of the aforementioned magnetic films to the vicinity of the back gap 36. Lead wires 37 and 38 which are used for connection with external circuits are respectively connected to both ends of the coil 32.

Figure 3:
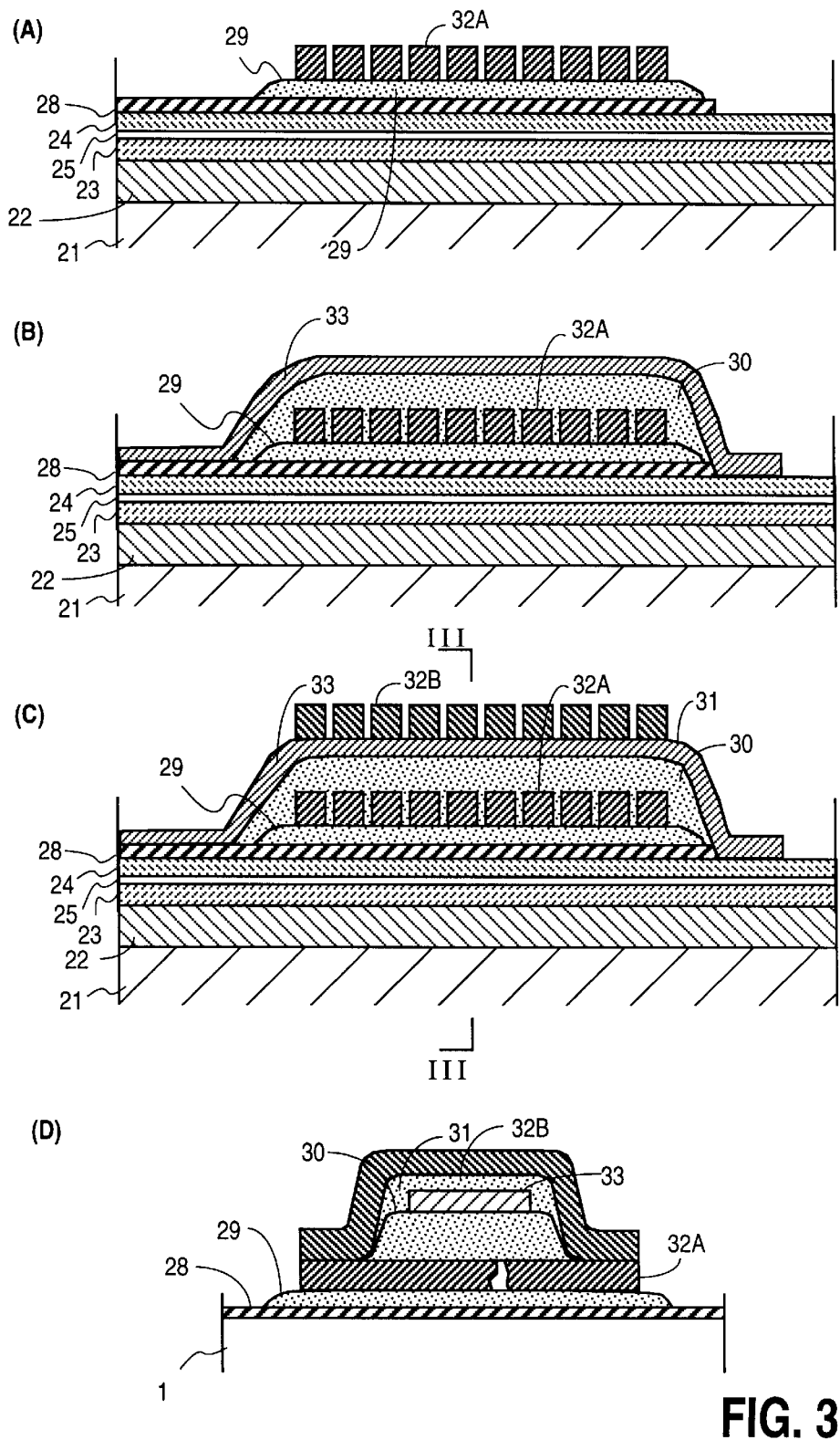
FIGS. 3A through 3C are sectional views which illustrate the formation of the conductive coil in the order of the processes involved.
FIG. 3D is a cross-sectional view along line III—III in FIG. 3C.

This solenoid-form coil can be formed using conventional manufacturing techniques as shown in FIG. 3. First, the first insulating layer 29 is formed on the surface of the magnetic gap film 28 by applying and baking a novolak resin as in conventional methods. Next, the lower coil part 32a is formed on the surface of the first insulating layer 29 by patterning Cu using a photolithographic technique, which is shown in FIG. 3A. The lower coil part 32a consists of numerous linear segments of the same length, width and thickness which are disposed at fixed intervals more or less parallel to the surface 35 which faces the recording medium.

Next, the second insulating layer 30 is formed with a width which is narrower than that of the coil 32, so that both ends of the respective lower segments are sufficiently exposed, by applying and baking a novolak resin. The upper magnetic film 33 is formed with a desired shape by patterning using a conventional photolithographic technique so that the yoke portion on the second insulating layer 30 has a fixed width narrower than the width of the coil 32 which sufficiently exposes both ends of each of the aforementioned lower coil part segments, and so that the pole portion at the tip end has the prescribed track width, as shown in FIG. 3B.

The third insulating layer 31 is formed on the yoke portion of the upper magnetic film 33 by applying and baking a novolak resin. This third insulating layer 31 covers and electrically insulates at least the aforementioned yoke portion. Furthermore, this insulating layer 31 is formed with a width that is narrower than that of the coil 32, so that both ends of the respective segments of the lower coil part 32a are sufficiently exposed.

Next, as is shown in FIGS. 3C and 3D, the upper coil part 32b is formed on the surface of the third insulating layer 31 by patterning Cu using a photolithographic technique. The upper coil part 32b consists of numerous linear segments of the same length, width and thickness which are disposed at fixed intervals parallel to each other and at an oblique angle with respect to the surface 35 facing the recording medium, so that the ends of each segment are alternately connected to the exposed end portions of adjacent segments of the lower coil part 32a.

In the present invention, as was described above, the coil 32 used for writing is formed in the shape of a solenoid centered on the upper magnetic film 33. As a result, the area surrounded by this coil is small compared to the area surrounded by a conventional spiral-form coil of the same length. Accordingly, the inductance is also smaller. Consequently, in the case of writing, the rise time of the current that is generated when a voltage is applied to the ends of the coil 32 is shortened, so that NLTS can be effectively reduced.

In the present invention, furthermore, the magnetic path length L of the upper magnetic film 33 is much shorter than in a conventional spiral-form coil. Accordingly, the eddy current loss generated in both magnetic films by the writing current flowing through the coil is reduced. As a result, in the case of writing, the rise time of the magnetic flux between the aforementioned upper and lower pole parts is shortened. Accordingly, NLTS can be ameliorated to an even greater extent.

Furthermore, in the present embodiment, the magnetic field generated by the current flowing through the coil 32 is concentrated in the upper magnetic film 33. Accordingly, the distance from the position where the magnetic flux is generated to the surface 35 facing the recording medium is shorter than in a conventional head, so that in addition to the abovementioned decrease in the eddy current loss, there is a decrease in the leakage of magnetic flux from the aforementioned pole portion. As a result, the writing magnetic field is larger than in a conventional head, so that NLTS can be further reduced.

Furthermore, in another embodiment, the coil 32 is shifted toward the pole portion instead of being wrapped around the entire length of the upper magnetic film 33 from the vicinity of the pole portion to the vicinity of the back gap 36 as in the abovementioned embodiment. As a result, the distance from the position where the magnetic flux is generated to the surface 35 facing the recording medium can be shortened even further.

It is noted that setting the width of the aforementioned yoke portion of the upper magnetic film 33 at a value which is equal to or less than the magnetic path length L, preferably a value which is equal to or less than ½ of the magnetic path length L, and even more preferably a value which is equal to or less than 30 microns, is desirable from the standpoint of the coil resistance of the coil 32 relative to the magnetic path length.

Figure 4:
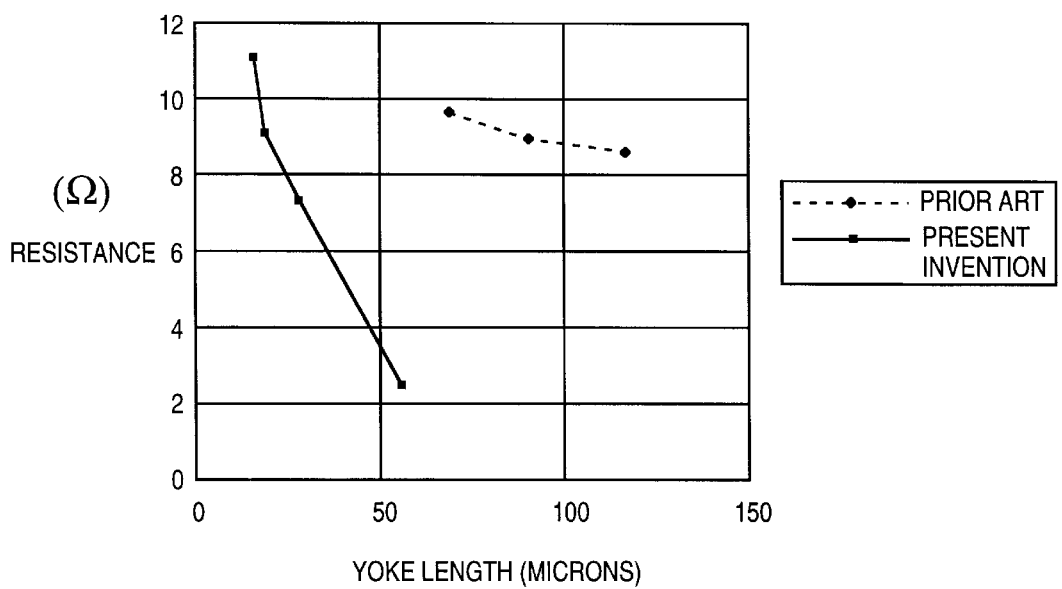
FIG. 4 is a graph which shows the relationship between the coil resistance of the conductive coil and the magnetic path length in the first embodiment shown in FIG. 1, in comparison with the case of a thin-film magnetic head which has a conventional structure.

In actuality, when, for example, the relationship between the magnetic path length, or yoke length L, and the electrical resistance of the coil 32 was measured in a case where the width W of the yoke portion of the upper magnetic film 33 was set at 20 microns or 13 microns, and the magnetic path length L was set at 60 microns or 23 microns, etc., for the composite type thin-film magnetic head of the embodiment shown in FIGS. 1 and 2, the results indicated by a solid line in FIG. 4 were obtained. In the case of a magnetic head with a magnetic path length L of 23 microns, the coil resistance was approximately 9 ohms. On the other hand, in the case of a magnetic head with a conventional spiral-form coil having approximately the same coil resistance, the magnetic path length L was 90 microns. Thus, in the present embodiment, it was possible to reduce the inductance by approximately 70 nH, and to ameliorate NLTS by approximately 20% compared to a magnetic head with a conventional spiral-form coil consisting of 15 turns.

Figure 5:
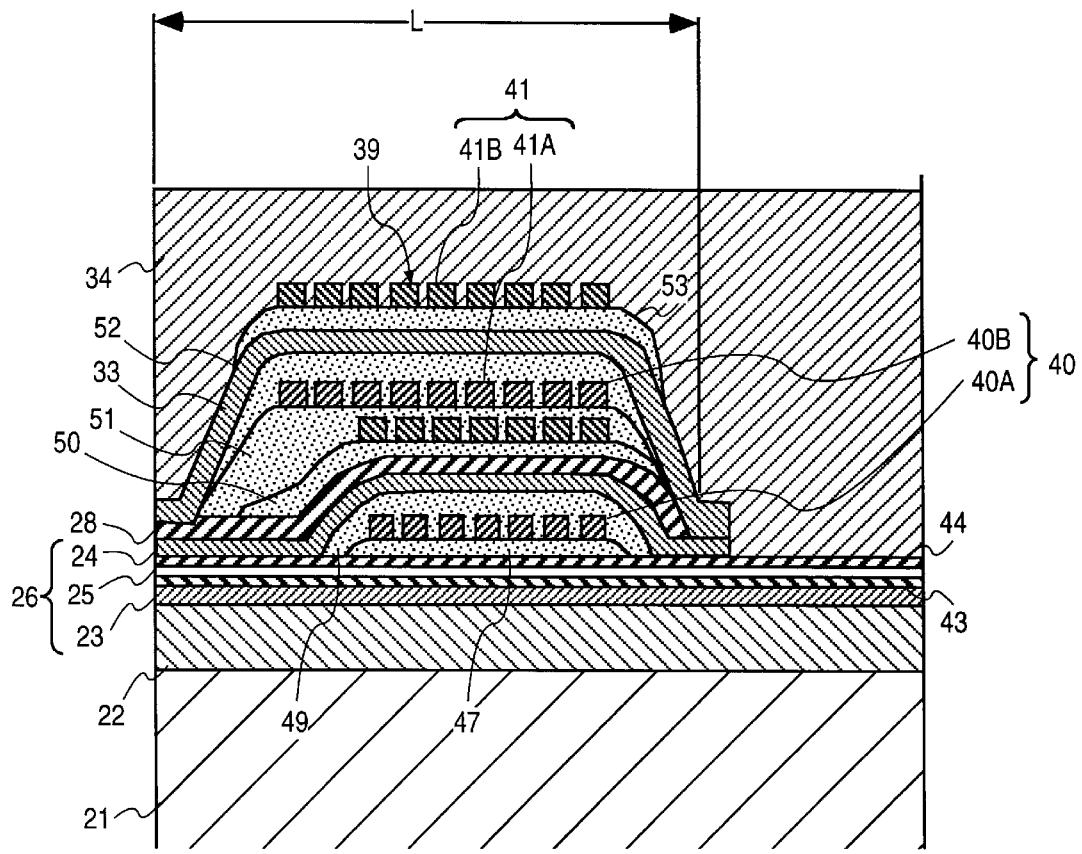
FIG. 5 is a sectional view which illustrates a second embodiment of the composite type thin-film magnetic head of the present invention.

FIG. 5 illustrates a second embodiment of the inductive/MR composite type thin-film magnetic head of the present invention. In this embodiment, a solenoid-form inductive coil 39 is wrapped around both the upper magnetic film 33 and the lower magnetic film 24, i.e., the upper shield 24 of the MR element 25, of the inductive head 27. This inductive coil 39 consists of a first coil 40 which is wrapped around the aforementioned lower magnetic film, and a second coil 41 which is wrapped around the aforementioned upper magnetic film. The aforementioned first and second coils are electrically connected to each other in series at one end, and are connected to external electrical circuits via lead wires 42 (only the connection on the side of the first coil is shown in FIG. 5) at the other end. In a separate embodiment, both ends of the aforementioned first and second coils may be respectively connected to external circuits by separate lead wires.

In the MR head 26, an MR element 25 is installed between a lower shield 23 and upper shield 24 with respective insulating films 43 and 44 interposed. As is shown more clearly in conjunction with FIG. 6, the upper shield 24 consists of a shield part 45 on the side of the MR element 25 which is sufficiently large to shield the MR element from undesirable magnetic fields other than the magnetic field generated by the magnetization transitions on the recording medium, and a part 46 located further to the rear, around which the first coil 40 is wrapped.

Figure 6:
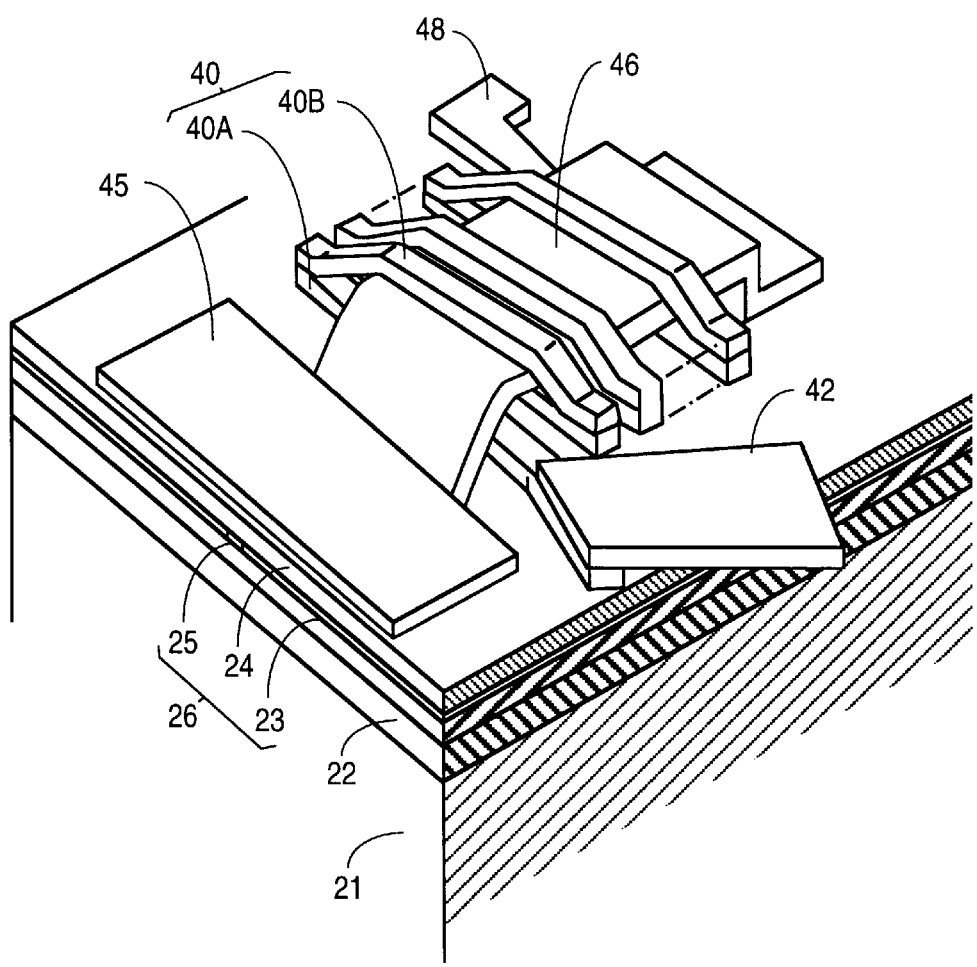
FIG. 6 is a schematic perspective illustrating the formation of the first layer of the conductive coil in the second embodiment shown in FIG. 5.

The first coil 40 is formed in the same manner as the conductive coil 32 of the first embodiment. First, a first insulating layer 47 consisting of a novolak resin is formed on the surface of the insulating film 44 to the rear of the shield part 45, and a lower coil part 40a is formed on top of this first insulating layer 47 by patterning Cu using a photolithographic technique. This lower coil part 40a is similarly constructed from numerous linear segments of the same length, width and thickness which are disposed at fixed intervals more or less parallel to the surface 35 facing the recording medium. In this case, as is shown in FIGS. 5 and 6, a terminal part 48 used for connection with the second coil 41 is formed on the innermost segment of the lower coil part 40a by extending the end portion of this segment to which a segment of the upper coil part (described later) is not connected.

Next, a second insulating layer 49 consisting of a novolak resin is similarly formed so that this layer has a width narrower than that of the first coil 40, and so that both ends of the respective segments of the lower coil part are sufficiently exposed. Then, an upper shield 24 with a prescribed shape is formed on top of the insulating film 44 and second insulating layer 49 by applying a plating of a soft magnetic material. In the embodiment shown in FIGS. 5 and 6, the portion 46 of the upper shield around which the coil is wrapped is formed with a narrower width than the first coil 40, so that both ends of the respective segments of the lower coil part 40a are sufficiently exposed. Thus, the overall shape of the upper shield is a T shape.

Using a method similar to that used for a conventional inductive head, a magnetic gap layer 28 is formed on top of the upper shield 24 so that both ends of the respective segments are sufficiently exposed in at least the region of the lower coil part 40a. Next, a third insulating layer 50 consisting of a novolak resin is formed on top of the magnetic gap layer 28 with a width narrower than that of the first coil 40, so that the aforementioned portion around which the coil is wrapped is insulated, and so that both ends of the respective segments of the lower coil part 40a are sufficiently exposed.

Next, the upper coil part 40b of the first coil 40 is formed beginning from a point on the upper surface of the third insulating layer 50 by patterning Cu using a photolithographic technique. The upper coil part 40b consists of numerous linear segments of the same length, width and thickness which are disposed at fixed intervals parallel to each other and at an oblique angle with respect to the surface 35 facing the recording medium. Both ends of each of these segments are alternately connected to the exposed end portions of adjacent segments of the aforementioned lower coil part 40a, thus forming the first coil 40.

A fourth insulating layer 51 is formed on the surface of the first coil 40 by applying and baking a novolak resin, so that the connection terminal part 48 of the aforementioned first coil is sufficiently exposed. Next, by means of a manufacturing process similar to that used for the conductive coil 32 in the first embodiment described with reference to FIG. 3, fifth and sixth insulating layers 52 and 53, lower and upper coil parts 41a and 41b each consisting of numerous segments, and an upper magnetic film 33, are laminated on top of the aforementioned fourth insulating layer, thus forming the second coil 41. In this case, the end portion of the innermost segment of the lower coil part 41a which is not connected to the upper coil part 41b is extended, and is connected with the connect on terminal part 48 of the first coil 40. In this way, the first coil 40 and second coil 41 are connected.

In the composite type thin-film magnetic head of the second embodiment, the conductive coil is divided into two parts and wrapped around the upper and lower magnetic films, so that the magnetic path length L can be made even shorter than in the first embodiment. Accordingly, NLTS can be ameliorated to an even greater extent. In a case where [a] the width of the shield part 45 of the upper shield 24. was set at 80 microns, [b] the width of the portion 46 around which the coil was wrapped was set at 15 microns and [c] the magnetic path length L was set at 18 microns in the embodiment shown in FIG. 5, it was possible to ameliorate NLTS by approximately 25%.

Figure 7:
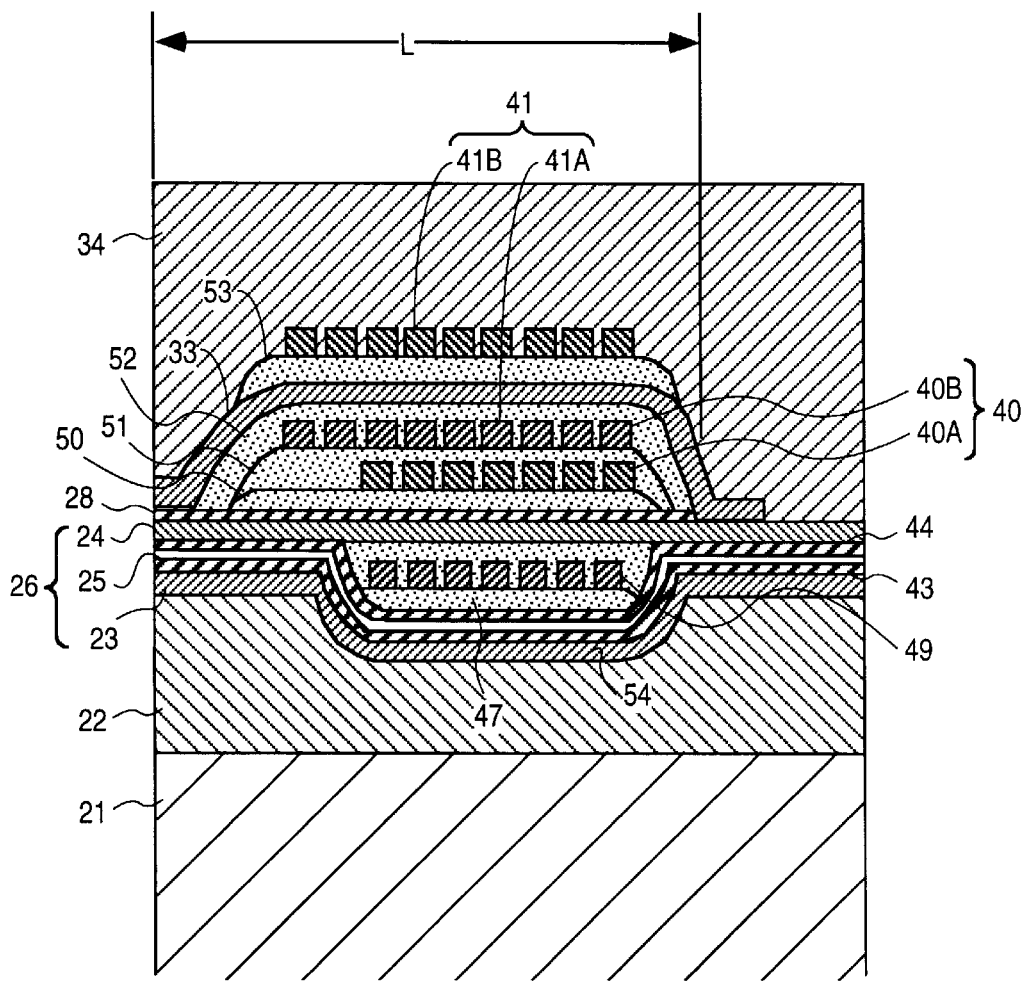
FIG. 7 is a sectional view which illustrates a third embodiment of the composite type thin-film magnetic head of the present invention.
Figure 8:
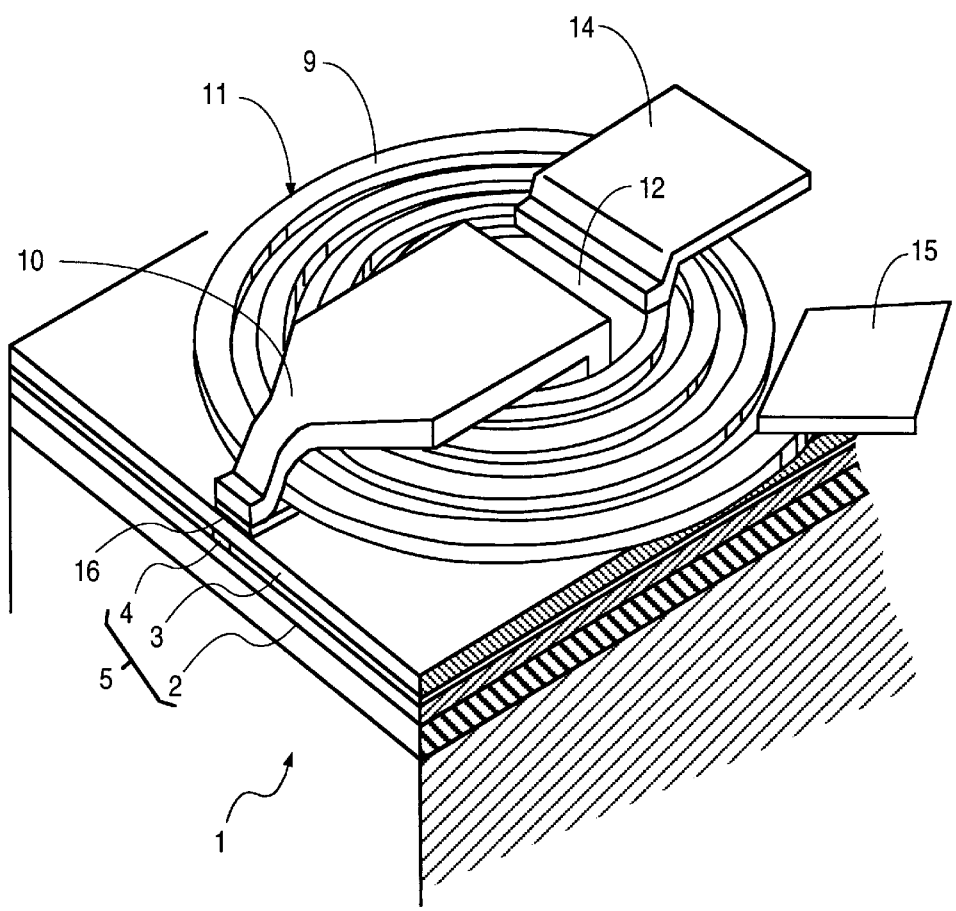
FIG. 8 is a schematic perspective view which illustrates the construction of a conventional inductive/MR composite type thin-film magnetic head.
Figure 9:
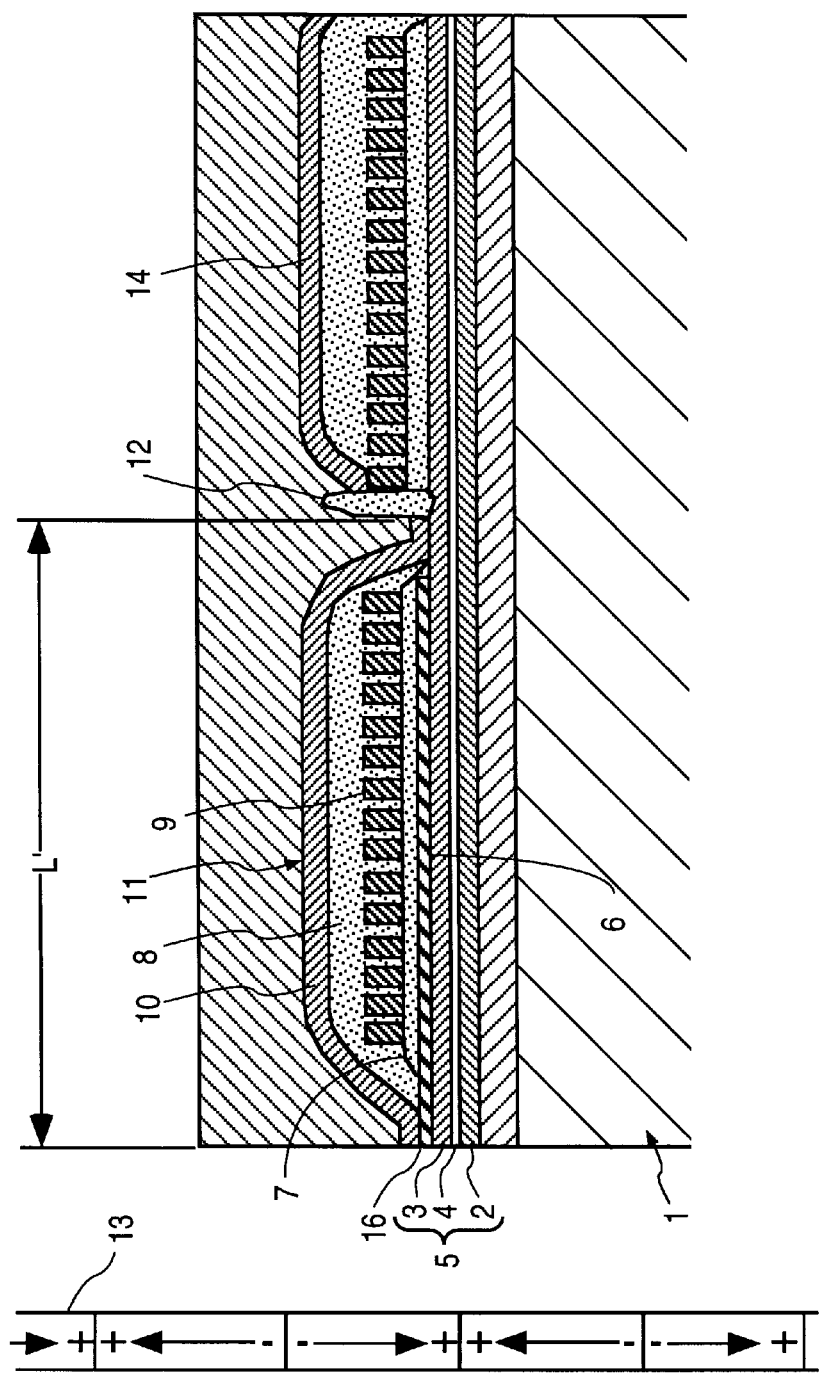
FIG. 9 is a longitudinal section of the composite type thin-film magnetic head shown in FIG. 8.
Figure 10A:
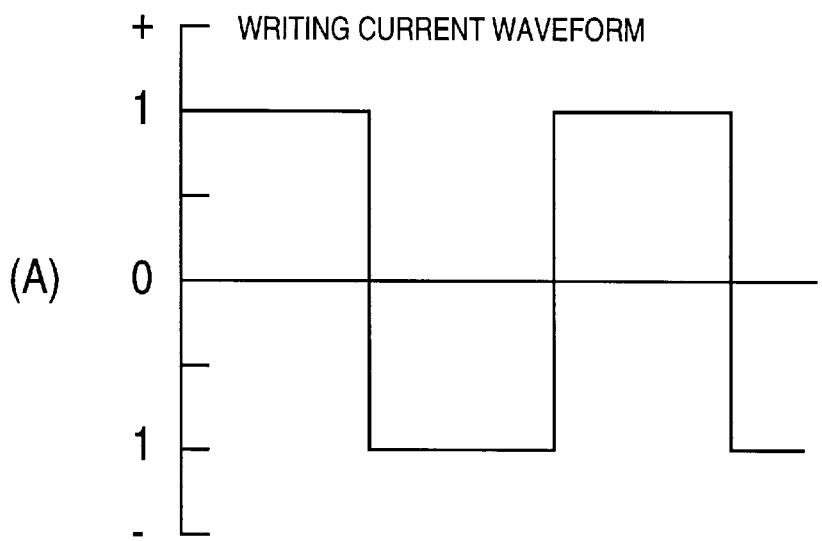
FIG. 10A is a diagram which shows the waveform of the writing current applied to the conductive coil.
Figure 10B:
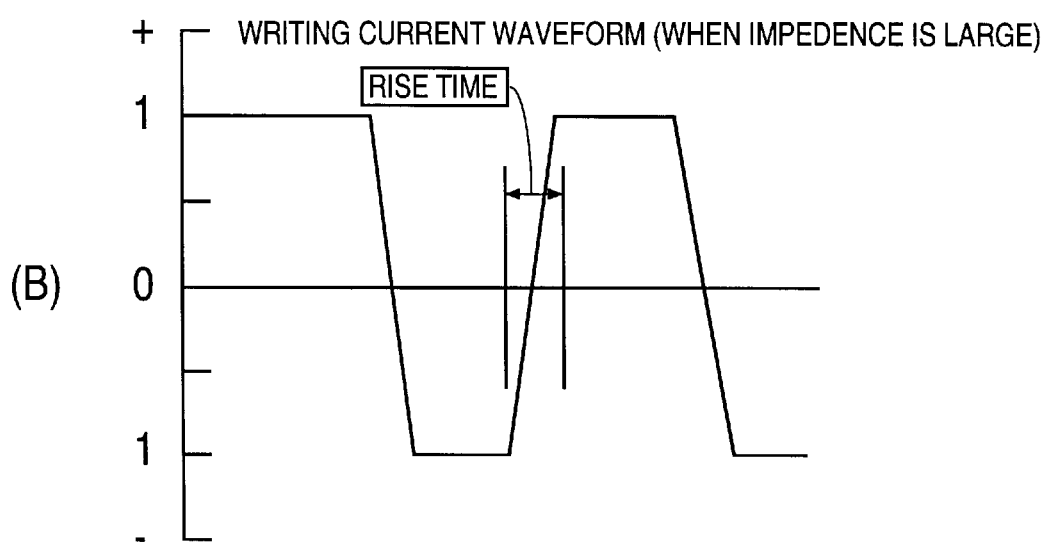
FIG. 10B is a diagram which shows the waveform of the writing current flowing through the conductive coil.
Figure 11:
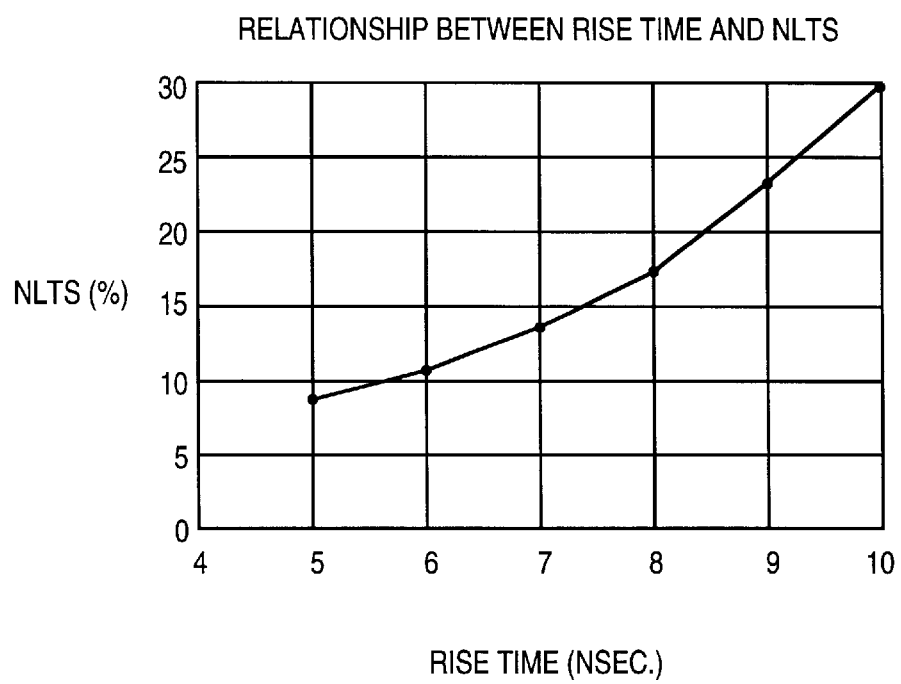
FIG. 11 is a graph which illustrates the relationship between NLTS and the rise time of the writing magnetic flux, with the value (%) obtained by dividing the shift of the magnetization transitions in the magnetic recording medium by the minimum magnetization inversion interval.

FIG. 7 illustrates a third embodiment of the present invention, in which a modification is added to the above-mentioned second embodiment. In this embodiment, the insulating underlayer film 22 is formed with a greater thickness than usual on the surface of the substrate 21. Furthermore, a recess 54 is formed beforehand by sputtering, etc., in the vicinity of the region where the first coil 40 is formed, after which the lower shield 23 is formed. This recess 54 is formed in a position which is sufficiently separated from the MR element 25 so that the lower shield 23 can prevent undesirable magnetic fields other than the magnetic field generated by the magnetization transitions on the recording medium from having an effect on the MR element.

After the MR element 25 and the insulating films 43 and 44 sandwiching this element from above and below have been formed on the lower shield 23, a first insulating layer 47 is formed inside the recess 54 by applying and baking a novolak resin. Next, the lower coil part 40a of the first coil 40, which consists of numerous linear segments of the same length, width and thickness disposed at fixed intervals and oriented more or less parallel to the surface 35 facing the recording medium, is formed by patterning Cu on the surface of the first insulating layer 47 in the same manner as in the second embodiment.

Both end portions of the segments of the lower coil part 40a which are connected with the upper coil part 40b are ordinarily disposed inside the recess 54. However, in a separate embodiment, it would also be possible to extend these segments from the recess to the surface of the substrate. Furthermore, a terminal part which is used for connection with the second coil 41 is formed on the end portion of the innermost segment of the lower coil part 40a to which a segment of the aforementioned upper coil part is not connected.

Beginning at the surface of the lower coil part 40a, the inside the of the recess 54 is filled with a novolak resin, and this resin is baked so that a second insulating layer 49 is formed. It is desirable that the upper surface of the second insulating layer 49 form a continuous plane with the surface of the substrate outside the aforementioned recess. Next, the upper shield 24 is formed by applying a plating of a soft magnetic material to the surface of the aforementioned substrate.

The upper shield 24 in the present embodiment is also formed in, for example, a T shape similar to that in the second embodiment shown in FIG. 6, so that the width of the upper shield 24 is narrower than that of the first coil 40, at least in the region of the recess 54 in which the first coil 40 is disposed, and so that both ends of the respective segments of the aforementioned lower coil part are sufficiently exposed. However, unlike the second embodiment, the present embodiment is advantageous from the standpoint of manufacture in that the upper shield can be formed on a flat surface. Furthermore, the lower coil part 40a is pre-set at a height which is such that sufficient electrical insulation is maintained between the lower coil part 40a and the aforementioned upper shield by the second insulating layer 49 inside the recess 54.

As in the case of the second embodiment, a magnetic gap layer 28 is formed on the surface of the upper shield 24 so that both ends cf the respective segments are sufficiently exposed at least in the region of the lower coil part 40a. Furthermore, a third insulating layer 50 consisting of a novolak resin is formed on top of the magnetic gap layer 28 with a narrower width than the first coil 40, so that the aforementioned upper shield is electrically insulated, and so that both ends of the respective segments of the lower coil part 40a are sufficiently exposed.

Next, beginning from a point on the surface of the third insulating layer 50, the upper coil part 40b of the first coil 40, which similarly consists of numerous linear segments of the same length, width and height disposed at fixed intervals and oriented parallel to each other and at an oblique angle relative to the surface 35 facing the recording medium, is formed. Both ends the aforementioned upper coil part 40b are alternately connected with the respective exposed end portions of adjacent segments of the aforementioned lower coil part 40a.

As in the second embodiment, a fourth insulating layer 51 consisting of a novolak resin is formed on the surface of the first coil 40 so that the aforementioned connection terminal part of the first coil is exposed. Furthermore, fifth and sixth insulating layers 52 and 53, lower and upper coil parts 41a and 41b each consisting of numerous segments, and an upper magnetic film 33, are successively laminated on top of the fourth insulating layer 51, thus forming the second coil 41. Furthermore, the second coil 41 is connected to the first coil 40 by connecting the end portion of the innermost segment of the lower coil part 41a, which is not connected to the upper coil part 41b, to the connection terminal part of the first coil 40.

In the present embodiment, since the lower coil part of the second coil 40 is installed on the insulating underlayer film 22, there is no need to form a step in the upper shield 24 as in the second embodiment. Accordingly, the step difference in the region of transition from the tip-end pole portion of the upper magnetic film 33 to the yoke portion can be reduced, so that the manufacturing yield can be increased, which is advantageous.

Preferred embodiments of the present invention were described above with reference to the attached figures. However, the present invention is not limited to the embodiments described above. Various modifications and alterations are possible within the technical scope of the present invention. For example, as long as the respective segments of the upper and lower coil parts form a solenoid-form coil in a zig-zag pattern, these segments may be disposed at an oblique angle relative to the surface facing the medium instead of being parallel to the surface facing the medium.

In the composite type thin-film magnetic head of the present invention, as a result of the use of a solenoid-form conductive coil in the inductive head used for writing, the area surrounded by the outermost circumference of the coil can be greatly reduced compared to conventional heads, so that the inductance can be greatly reduced. Consequently, the rise time of the writing current can be greatly shortened, and the eddy current loss of the writing current can be greatly reduces, so that the rise time of the magnetic flux can be greatly shortened. Accordingly, NLTS can be greatly reduced, so that the occurrence of read-out error can be effectively prevented while realizing high-speed, high-density recording, thus making it possible to achieve high performance.

What is claimed is:

1. An inductive/MR composite type thin-film magnetic head, comprising:

an inductive head used for writing, the inductive head including a magnetic gap layer, a conductive coil and insulating layers laminated between an upper magnetic film and a lower magnetic film, wherein the conductive coil is formed in a shape of a solenoid wrapped around the upper or lower magnetic film with the insulating layers interposed; and a magnetic resistance (MR) head used for read-out, the MR head including an MR element sandwiched between an upper shield and a lower shield, wherein the lower magnetic film includes the upper shield, the upper shield having a T shape including a first shield part to shield the MR element and a second shield part around which the conductive coil is wrapped; wherein the second shield part has a width, in a direction of a track width, smaller than a width of the first shield part in the direction of the track width.

2. The thin-film magnetic head described in claim 1, wherein conductive coil is wrapped around both the upper magnetic film and the lower magnetic film with the insulating layers interposed.

3. The thin-film magnetic head described in claim 2 wherein the conductive coil is formed by forming a lower coil part including a plurality of segments on a surface of a first insulating layer of the insulating layers; and forming an upper coil part including a plurality of segments from a point above a second insulating layer of the insulating layers, the upper magnetic film or the lower magnetic film and a third insulating layer of the insulating layers, which are all laminated on a surface of the lower coil part, such that respective end portions of the plurality of segments of the upper coil part are alternately coupled with respective end portions of the plurality of segments of the lower coil part.

4. The thin-film magnetic head claimed described in claim 3 wherein a width of at least a portion of the upper magnetic film or the lower magnetic film around which the conductive coil is wrapped is equal to or less than a magnetic path length.

5. The thin-film magnetic head claimed described in claim 2 wherein a width of at least a portion of the upper magnetic film or the lower magnetic film around which the conductive coil is wrapped is equal to or less than a magnetic path length.

6. The thin-film magnetic head described in claim 1 wherein the conductive coil is formed by forming a lower coil part including a plurality of segments on a surface of a first insulating layer of the insulating layers; and forming an upper coil part including a plurality of segments from a point above a second insulating layer of the insulating layers, the upper magnetic film or the lower magnetic film and a third insulating layer of the insulating layers, which are all laminated on a surface of the lower coil part, such that respective end portions of the plurality of segments of the upper coil part are alternately coupled with respective end portions of the plurality of segments of the lower coil part.

7. The thin-film magnetic head claimed described in claim 6 wherein a width of at least a portion of the upper magnetic film or the lower magnetic film around which the conductive coil is wrapped is equal to or less than a magnetic path length.

8. The thin-film magnetic head claimed described in claim 1 wherein a width of at least a portion of the upper magnetic film or the lower magnetic film around which the conductive coil is wrapped is equal to or less than a magnetic path length.

* * * * *